(12) United States Patent
Yamashita (10) Patent No.: US 11,499,464 B2
(45) Date of Patent: Nov. 15, 2022

(54) EXHAUST DEVICE

(71) Applicant: SUZUKI MOTOR CORPORATION, Hamamatsu (JP)

(72) Inventor: Kohei Yamashita, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/388,899

(22) Filed: Jul. 29, 2021

(65) Prior Publication Data

US 2022/0042441 A1 Feb. 10, 2022

(30) Foreign Application Priority Data

Aug. 7, 2020 (JP) .............................. JP2020-134390

(51) Int. Cl.
*F01N 13/00* (2010.01)
*F01N 3/28* (2006.01)

(52) U.S. Cl.
CPC .......... *F01N 3/2885* (2013.01); *F01N 3/2803* (2013.01); *F01N 2490/08* (2013.01)

(58) Field of Classification Search
CPC .. F01N 3/2803; F01N 2490/08; F01N 3/2885; F01N 1/083; F01N 1/089; F01N 2590/04
USPC .......................................................... 60/299
See application file for complete search history.

(56) References Cited

U.S. PATENT DOCUMENTS

| | | | | |
|---|---|---|---|---|
| 5,376,341 A | * | 12/1994 | Gulati | F01N 3/2867 422/179 |
| 5,972,299 A | * | 10/1999 | Huang | F01N 3/2033 422/174 |
| 7,273,592 B2 | * | 9/2007 | Jacob | F01N 13/1894 60/299 |

(Continued)

FOREIGN PATENT DOCUMENTS

| | | | | |
|---|---|---|---|---|
| JP | 11117723 A | * | 4/1999 | F01N 3/2885 |
| JP | 5086056 B2 | | 9/2012 | |

(Continued)

OTHER PUBLICATIONS

Extended European Search Report dated Dec. 22, 2021, issued by the European Patent Office in corresponding application EP 21189235. 1.

*Primary Examiner* — Jonathan R Matthias
(74) *Attorney, Agent, or Firm* — Stein IP, LLC (57) ABSTRACT

There is provided an exhaust device that purifies exhaust gas discharged from an engine through an exhaust pipe. The exhaust device includes: a chamber that forms an expansion chamber of the exhaust gas at a downstream side of the exhaust pipe; a partition wall that partitions the expansion chamber into a first expansion chamber and a second expansion chamber; an introduction pipe that enters the second expansion chamber from a downstream end of the exhaust pipe; and a catalyst interposed at an intermediate portion of the introduction pipe in the second expansion chamber. The partition wall is formed with a first opening connecting an outlet of the introduction pipe to the first expansion chamber (Continued)

and a second opening connecting the first expansion chamber to the second expansion chamber, and the second opening overlaps with the catalyst when viewed from a side of the first expansion chamber.

6 Claims, 9 Drawing Sheets

(56) References Cited

U.S. PATENT DOCUMENTS

| | | | |
|---|---|---|---|
| 7,487,633 B2* | 2/2009 | Popik | F01N 3/2885 |
| | | | 60/302 |
| 7,818,964 B2 | 10/2010 | Muramatsu et al. | 60/324 |
| 7,828,114 B2* | 11/2010 | Morita | F01N 13/009 |
| | | | 181/254 |
| 8,985,271 B1 | 3/2015 | Yoshida | 181/269 |
| 2004/0079074 A1* | 4/2004 | Yamamoto | F01N 3/2013 |
| | | | 60/299 |
| 2006/0101813 A1* | 5/2006 | Wu | F01N 3/2885 |
| | | | 60/299 |
| 2009/0165448 A1 | 7/2009 | Mitsukawa et al. | 60/299 |
| 2014/0090926 A1* | 4/2014 | Uzawa | F01N 13/08 |
| | | | 181/228 |
| 2017/0159531 A1 | 6/2017 | Shibuki et al. | |
| 2018/0202343 A1* | 7/2018 | Matsumoto | F01N 13/008 |

FOREIGN PATENT DOCUMENTS

| | | |
|---|---|---|
| JP | 2018-115652 A | 7/2018 |
| JP | 2018-178731 A | 11/2018 |

* cited by examiner

EXHAUST DEVICE

CROSS-REFERENCE TO RELATED APPLICATIONS

This application is based on Japanese Patent Application No. 2020-134390 filed on Aug. 7, 2020, the contents of which are incorporated herein by way of reference.

TECHNICAL FIELD

The present invention relates to an exhaust device.

BACKGROUND

In an exhaust system of a straddle-type vehicle, a chamber for muffling is provided at a downstream side of an exhaust pipe extending from an engine. When the exhaust gas flows into the chamber from the exhaust pipe, the exhaust gas expands in the chamber and the energy of the exhaust noise is attenuated. In the exhaust system of the straddle-type vehicle, although the exhaust gas is purified by a catalyst, a sufficient purification performance of the exhaust gas cannot be obtained until the catalyst reaches the activation temperature. Therefore, there is known a structure in which a catalyst is installed in a chamber to be warmed up to an activation temperature at an early stage using heat of high-temperature exhaust gas in the chamber (for example, see Patent Literature 1).

Patent Literature 1: JP-A-2018-178731

With stricter regulations on the exhaust gas in recent years, there is a demand for further improvement of the exhaust gas purification performance. In the exhaust device described in Patent Literature 1, however, since the catalyst is installed in the chamber, a distance from an exhaust port of an engine to the catalyst is long and the activation of the catalyst may be delayed.

The present invention is made in view of the above circumstance, and an object of the present invention is to provide an exhaust device that can implement early activation of a catalyst.

SUMMARY

To solve the above problem, an exhaust device according to an aspect of the present invention purifies exhaust gas discharged from an engine through an exhaust pipe. The exhaust device includes: a chamber that forms an expansion chamber of the exhaust gas at a downstream side of the exhaust pipe; a partition wall that partitions the expansion chamber into a first expansion chamber and a second expansion chamber; an introduction pipe that enters the second expansion chamber from a downstream end of the exhaust pipe; and a catalyst interposed at an intermediate portion of the introduction pipe in the second expansion chamber. The partition wall is formed with a first opening connecting an outlet of the introduction pipe to the first expansion chamber and a second opening connecting the first expansion chamber to the second expansion chamber. The second opening overlaps with the catalyst when viewed from a side of the first expansion chamber.

DESCRIPTION OF EMBODIMENTS

An exhaust device according to an aspect of the present invention purifies the exhaust gas discharged from an engine through an exhaust pipe. A chamber forming an expansion chamber of the exhaust gas is provided at a downstream side of the exhaust pipe. The expansion chamber of the chamber is partitioned into a first expansion chamber and a second expansion chamber by a partition wall. An introduction pipe enters the second expansion chamber from a downstream end of the exhaust pipe, and a catalyst is interposed in the second expansion chamber at an intermediate portion of the introduction pipe. An outlet of the introduction pipe is connected to the first expansion chamber through a first opening of the partition wall, the exhaust gas flows from the exhaust pipe to the introduction pipe in the chamber, passes through the catalyst, and flows into the first expansion chamber through the first opening. The first expansion chamber is connected to the second expansion chamber through a second opening of the partition wall, and the exhaust gas in the first expansion chamber flows into the second expansion chamber through the second opening. At this time, the second opening overlaps with the catalyst when viewed from the first expansion chamber side, and the exhaust gas is intensively blown from the second opening to an outer surface of the catalyst in the second expansion chamber. The catalyst is warmed up in a short time by the heat of the high-temperature exhaust gas, and the purification performance of the exhaust gas can be improved by early activation of the catalyst.

Embodiments

Figure 1:
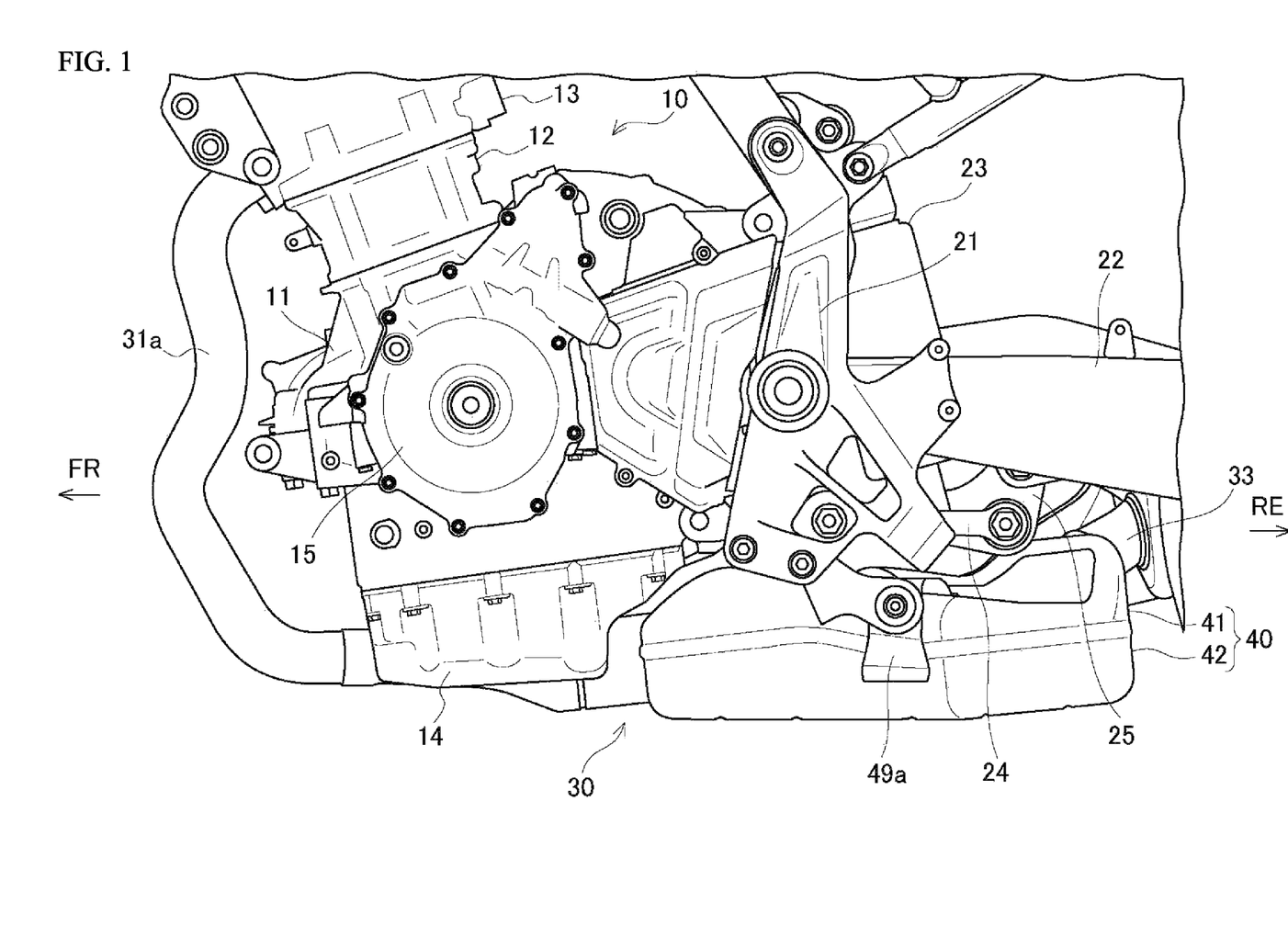
FIG. 1 is a left view of a periphery of an engine according to a present embodiment.
Figure 2:
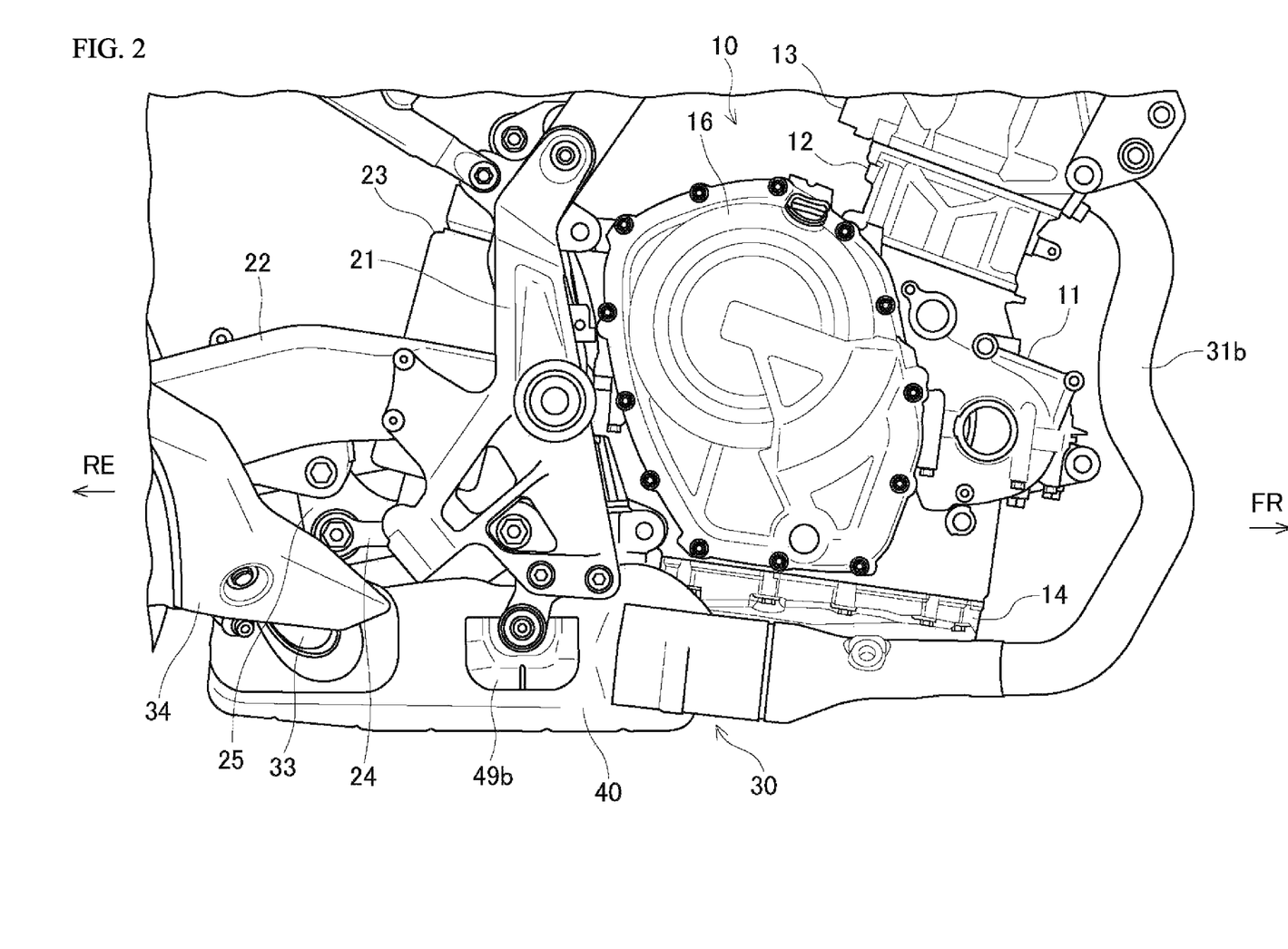
FIG. 2 is a right view of the periphery of the engine according to the present embodiment.

Hereinafter, a present embodiment will be described in detail with reference to the accompanying drawings. FIG. 1 is a left view of a periphery of an engine according to the present embodiment. FIG. 2 is a right view of the periphery of the engine according to the present embodiment. In the following drawings, an arrow FR indicates a vehicle front side, an arrow RE indicates a vehicle rear side, an arrow L indicates a vehicle left side, and an arrow R indicates a vehicle right side. Upstream side and downstream side indicate upstream side and downstream side in the flow direction of the exhaust gas.

As shown in FIGS. 1 and 2, an engine 10 is a parallel two-cylinder engine. A cylinder block 12 is disposed at an upper portion of a crankcase 11. A cylinder head 13 is attached to an upper portion of the cylinder block 12. A head cover (not shown) is attached to an upper portion of the cylinder head 13. An oil pan 14 that stores oil for lubrication and cooling is attached to a lower portion of the crankcase 11. A magneto cover 15 that covers a magneto chamber in the crankcase is attached to a left side surface of the crankcase 11. A clutch cover 16 that covers a clutch chamber in the crankcase is attached to a right side surface of the crankcase 11.

The engine 10 is supported by a pair of left and right main frames 21 of a straddle-type vehicle. Swing arms 22 that support a rear wheel (not shown) are swingably supported by the pair of main frames 21. The swing arms 22 are coupled to a rear suspension 23 for absorbing shock to the rear wheel. An upper end of the rear suspension 23 is coupled to the main frames 21. A lower end of the rear suspension 23 is coupled to the swing arms 22 via a link arm 24 and a link bracket 25. A chamber 40 of an exhaust device 30 is supported at lower portions of the pair of main frames 21 via left and right brackets 49a and 49b.

The exhaust gas flows into the chamber 40 through a pair of exhaust pipes 31a and 31b and is discharged from the chamber 40 to the outside through a muffler 34. At this time, although the exhaust gas is purified by a catalyst in the exhaust path, a sufficient purification performance cannot be obtained until the catalyst reaches the activation temperature. Therefore, in the exhaust device 30 according to the present embodiment, a pipe extending from rear ends of the pair of exhaust pipes 31a and 31b enters the chamber 40, and the catalyst is installed at an intermediate portion of the pipe in the chamber 40. The exhaust gas that has passed through the catalyst forms a flow in the chamber 40 toward the outer surface of the catalyst, and the catalyst in the chamber 40 is activated at an early stage by the heat of the exhaust gas.

Figure 3:
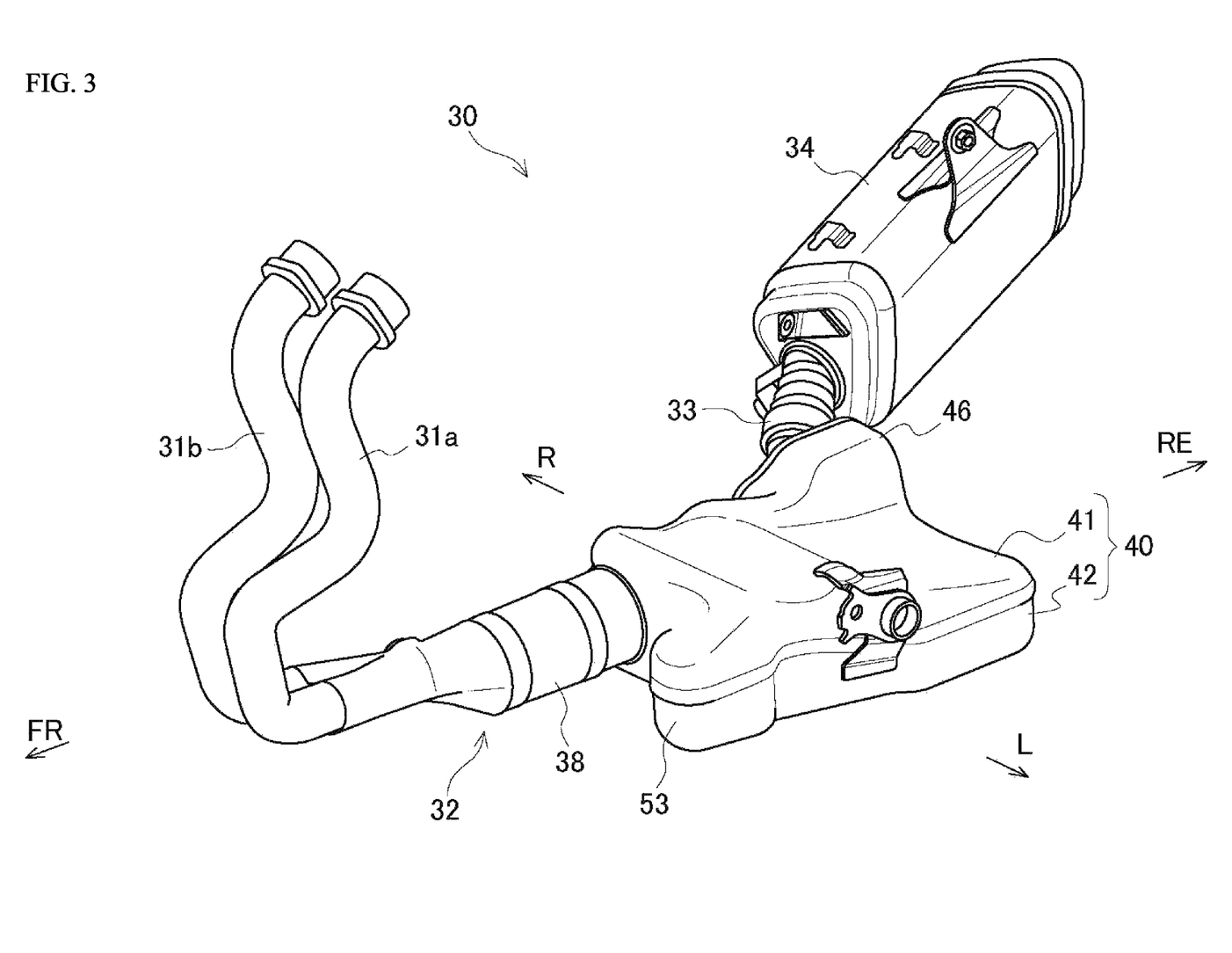
FIG. 3 is a perspective view of an exhaust device according to the present embodiment.
Figure 4:
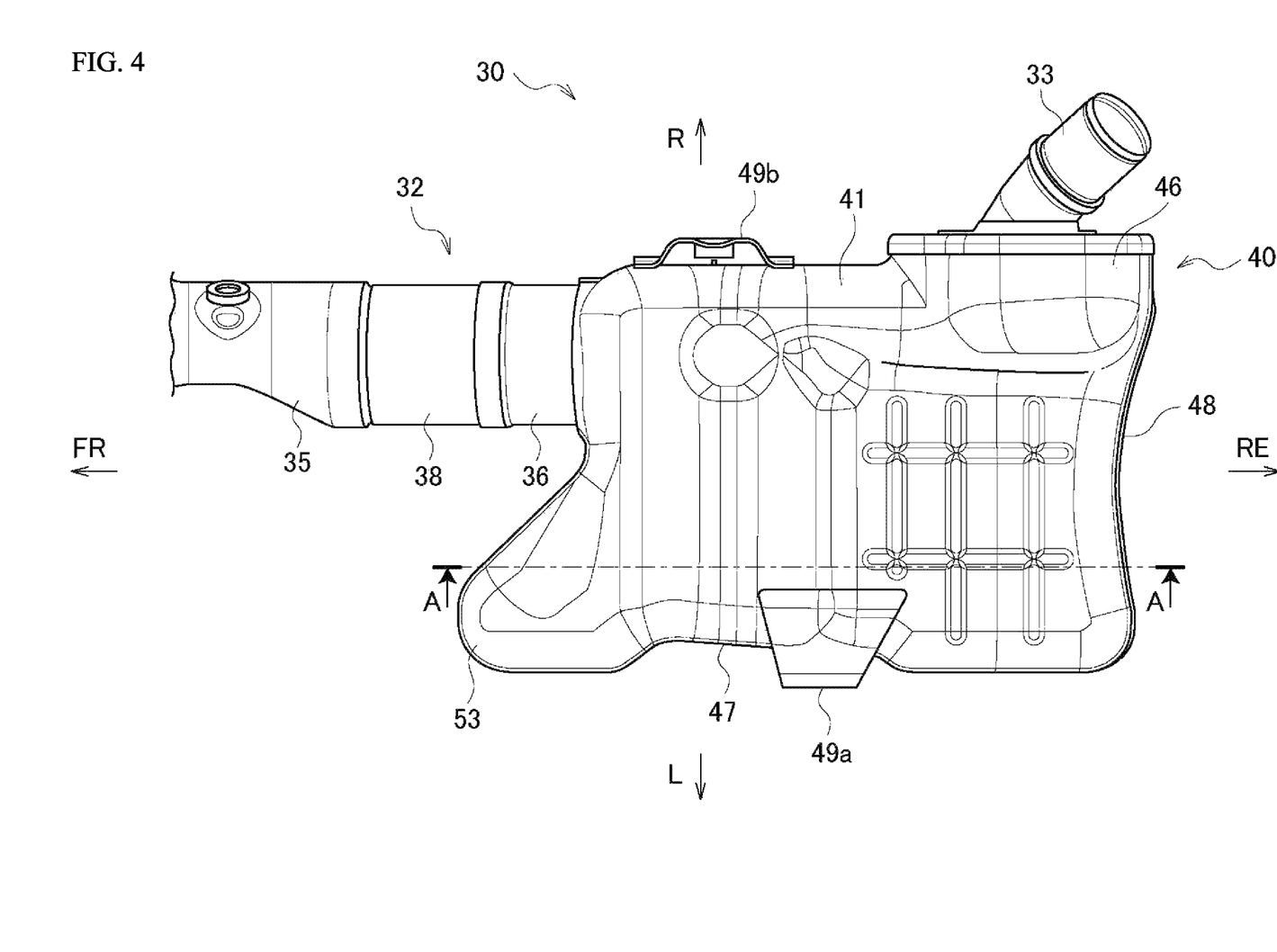
FIG. 4 is a top view of a chamber according to the present embodiment.
Figure 5:
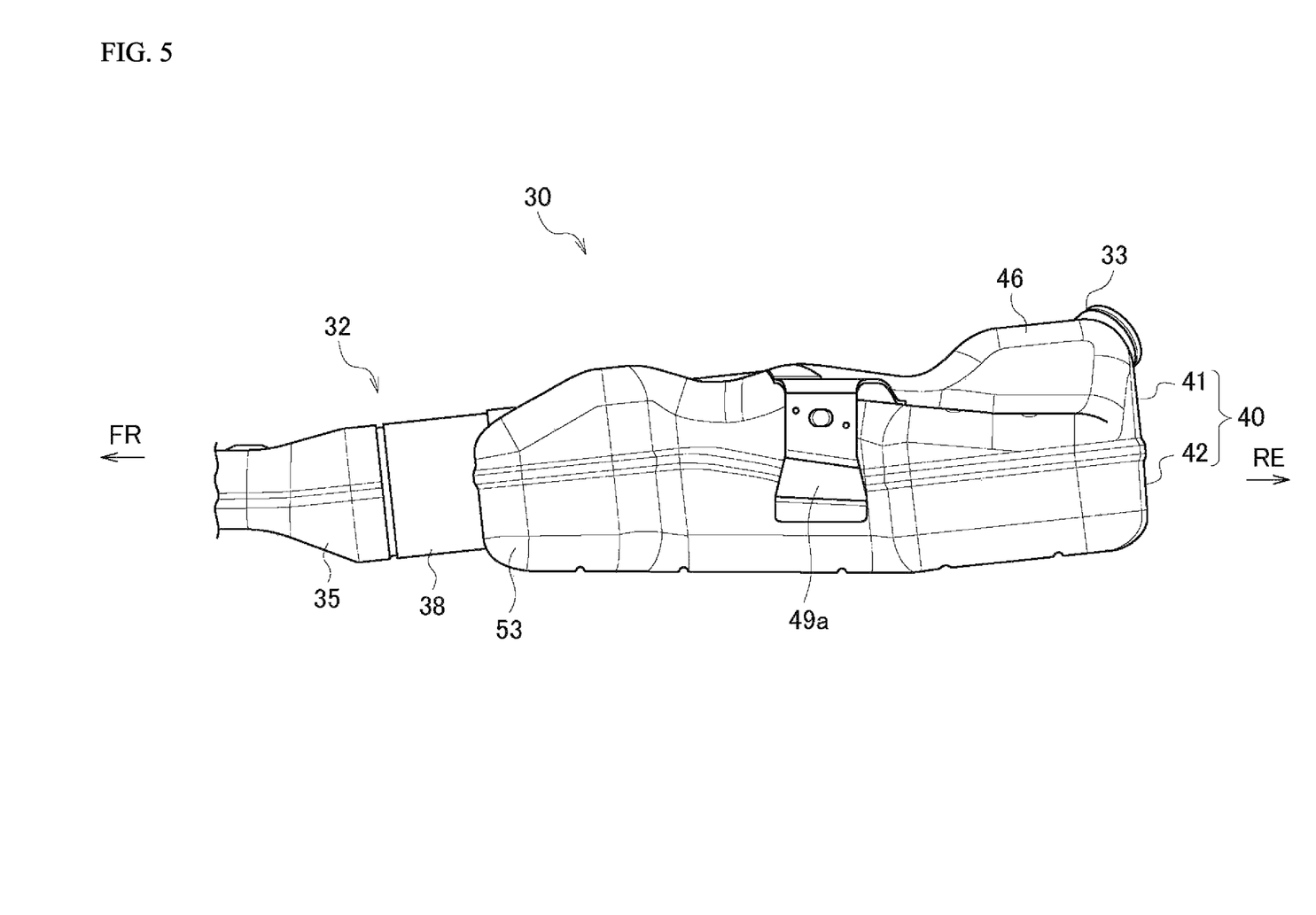
FIG. 5 is a side view of the chamber according to the present embodiment.
Figure 6:
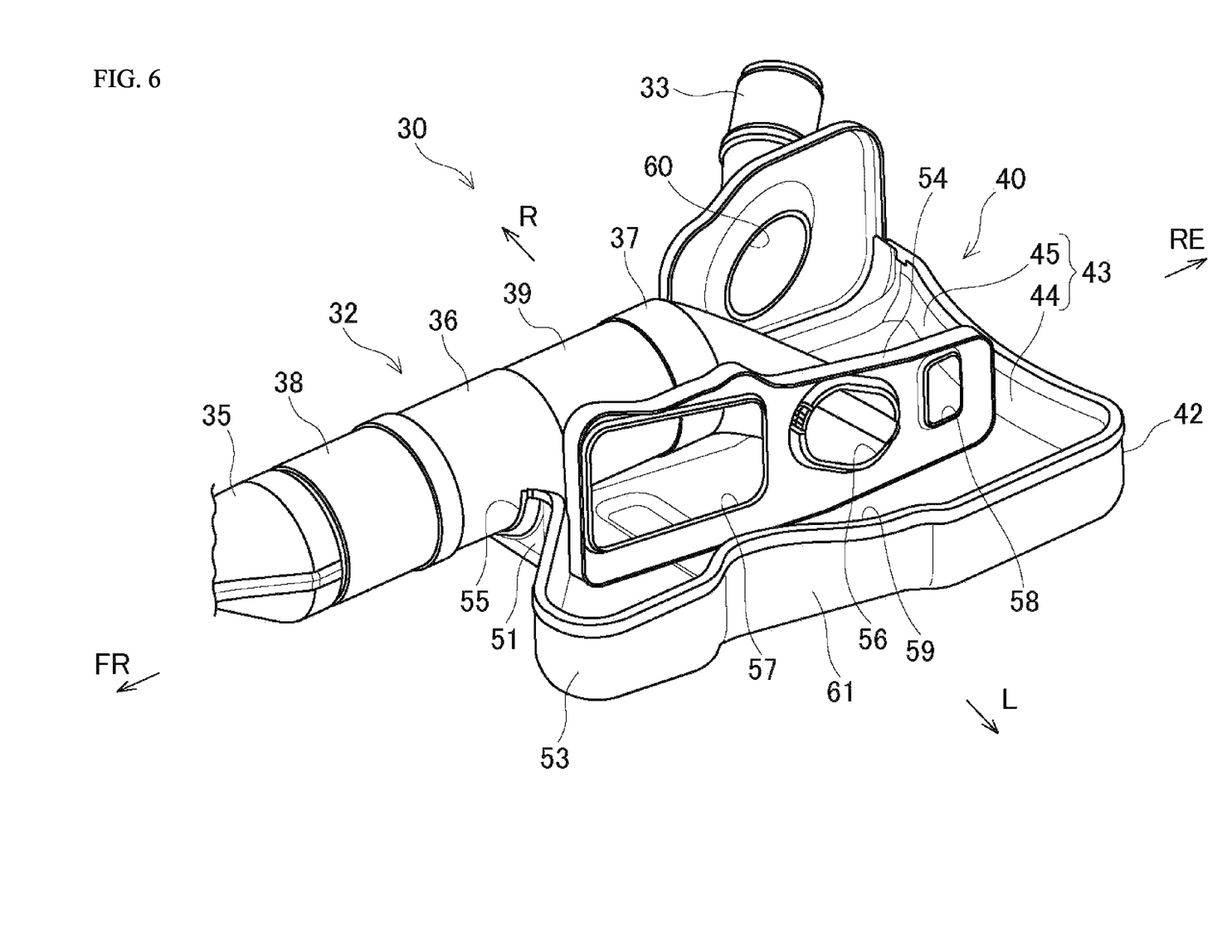
FIG. 6 is a perspective view of the chamber according to the present embodiment when an upper half body is removed.
Figure 7:
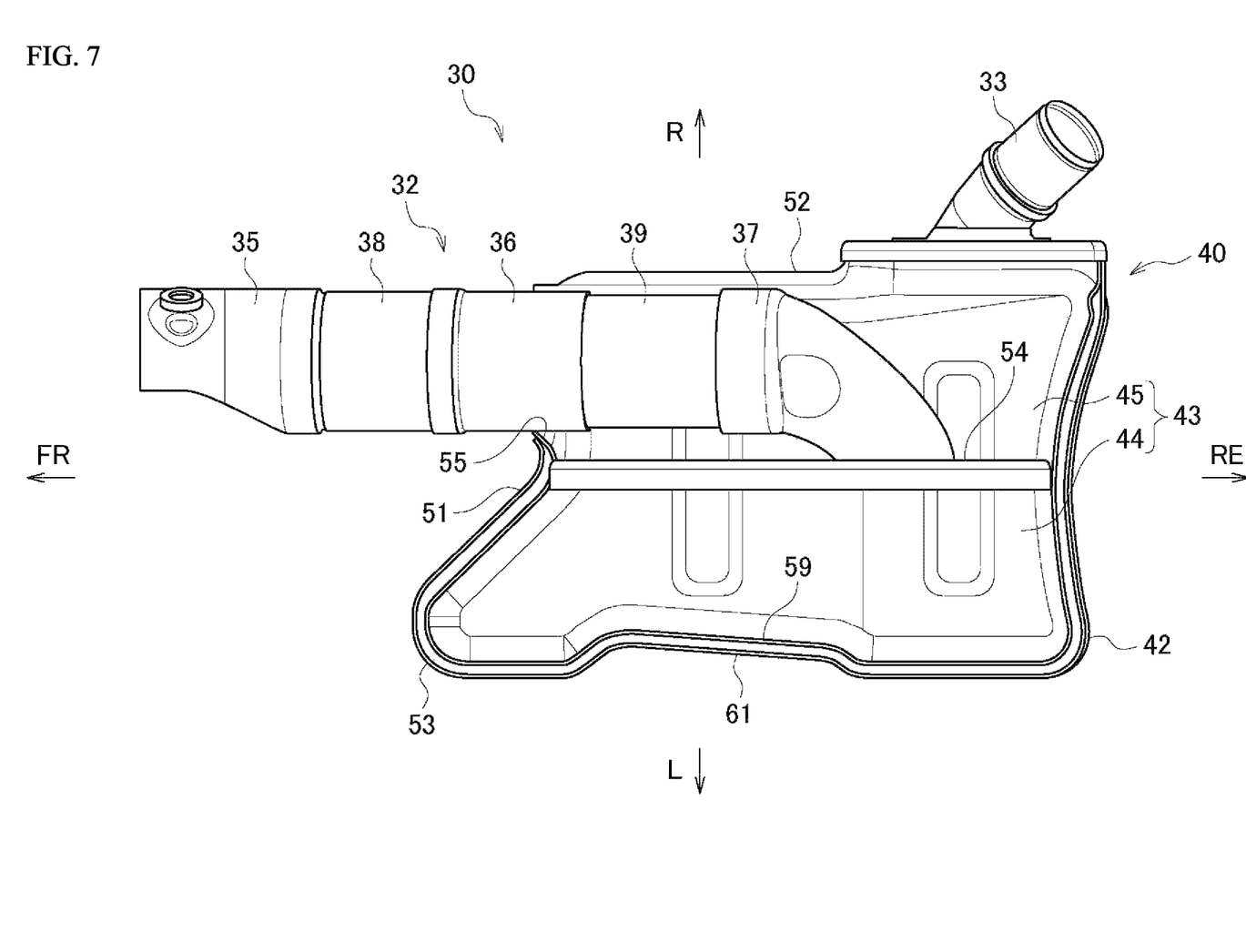
FIG. 7 is a top view of the chamber according to the present embodiment when the upper half body is removed.
Figure 8:
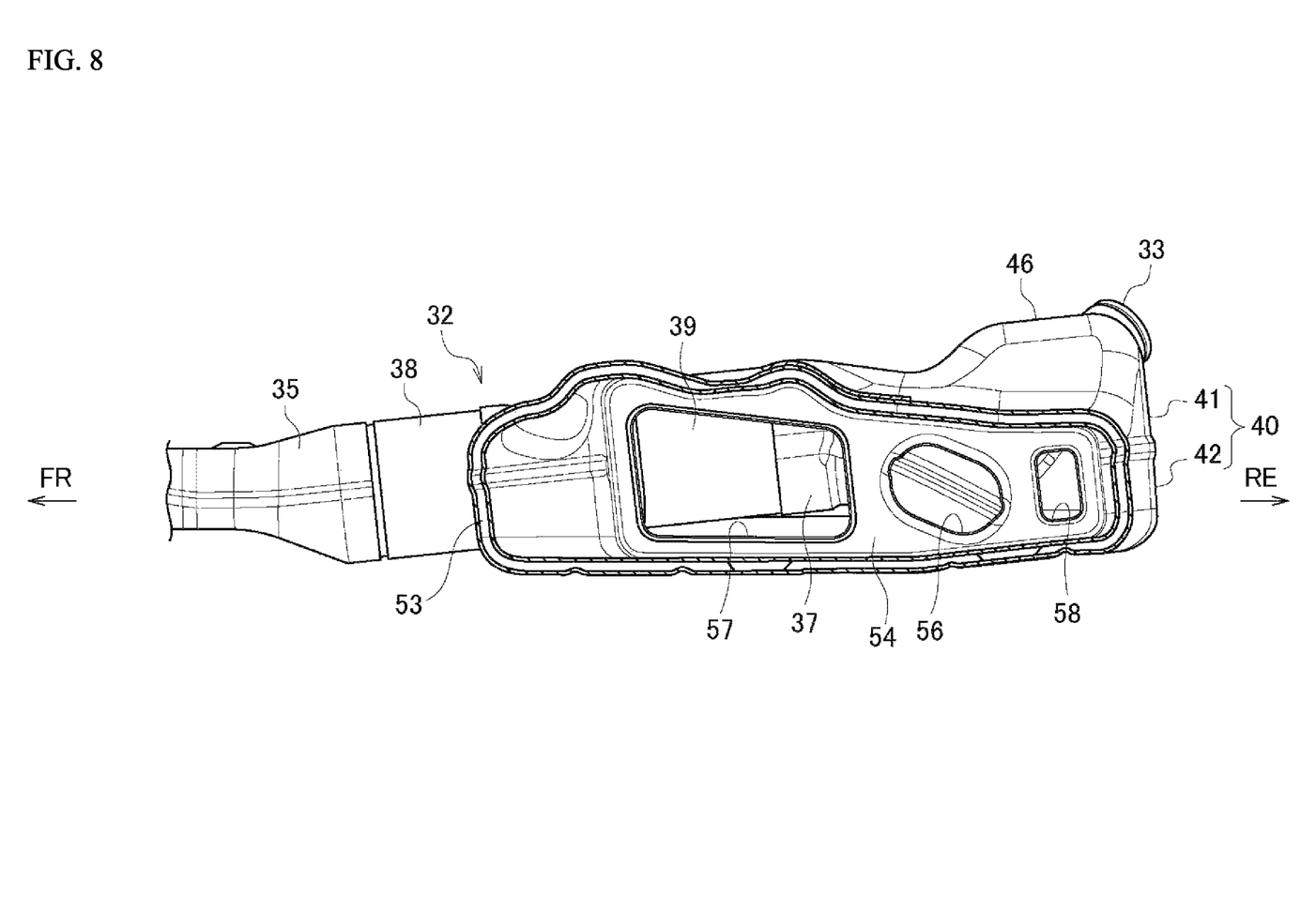
FIG. 8 is a cross-sectional view of the chamber of FIG. 4 taken along a line A-A.

Hereinafter, a detailed configuration of the exhaust device will be described with reference to FIGS. 1 and 3 to 8. FIG. 3 is a perspective view of an exhaust device according to the present embodiment. FIG. 4 is a top view of a chamber according to the present embodiment. FIG. 5 is a side view of the chamber according to the present embodiment. FIG. 6 is a perspective view of the chamber according to the present embodiment when an upper half body is removed. FIG. 7 is a top view of the chamber according to the present embodiment when the upper half body is removed. FIG. 8 is a cross-sectional view of the chamber of FIG. 4 taken along a line A-A.

As shown in FIG. 3, the exhaust device 30 reduces the exhaust noise of the exhaust gas discharged from the engine 10 (see FIG. 1) through the exhaust pipes 31a and 32b and purifies the exhaust gas. The exhaust pipes 31a and 31b extend downward from a front surface of the engine 10 and are integrated into one by an introduction pipe 32. The integrated one exhaust pipe is connected to the chamber 40. An upstream side of the introduction pipe 32 is exposed to the outside of the chamber 40. A first catalyst 38 is interposed on the upstream side of the introduction pipe 32. A downstream side of the introduction pipe 32 enters the chamber 40. A second catalyst 39 (see FIG. 6) is interposed on the downstream side of the introduction pipe 32.

When the exhaust gas flows from the exhaust pipes 31a and 31b into the introduction pipe 32, air pollutants such as carbon monoxide (CO), hydrocarbons (HC), and nitrogen oxides (NOx) contained in the exhaust gas are purified by the first and second catalysts 38 and 39.

When the exhaust gas flows from the introduction pipe 32 into the chamber 40, the exhaust gas is expanded by an expansion chamber 43 (see FIG. 6) in the chamber 40 and the exhaust noise is reduced. The muffler 34 is connected to a downstream side of the chamber 40 via a lead-out pipe 33, and the exhaust gas that has passed through the chamber 40 is discharged to the outside from the muffler 34. Since the exhaust noise is reduced by the chamber 40, an expansion chamber of the muffler 34 is reduced in size and the muffler 34 is reduced in size.

As shown in FIGS. 1, 4, and 5, the chamber 40 has a substantially rectangular box shape in a top view and includes an upper half body 41 and a lower half body 42. The expansion chamber 43 of the exhaust gas (see FIG. 6) is formed at a downstream side of the exhaust pipes 31a and 31b. As described above, the chamber 40 is attached to the lower portions of the main frames 21 and is located below the engine 10 and rearward of the oil pan 14. The overall height of the chamber 40 is reduced so that the chamber 40 would not interfere with the link arm 24 or the like of the rear suspension 23. Although the height of the chamber 40 decreases from a front side toward a rear side, an attachment portion 46 for the lead-out pipe 33 on a rear right side of the chamber 40 bulges upward.

A concave surface 47 for avoiding a center stand (not shown) is provided on a left side surface of the chamber 40. The bracket 49a for attaching the chamber 40 is installed on the concave surface 47. A right side surface of the chamber 40 is substantially flat, the bracket 49b for attaching the chamber 40 is installed on a front side of the right side surface, and the exhaust gas lead-out pipe 33 is connected to a rear side of the right side surface. A concave surface 48 for avoiding the rear wheel (not shown) is provided on a rear surface of the chamber 40. A bulging portion 53, which will be described later, is formed on a left side of a front surface of the chamber 40. The exhaust gas introduction pipe 32 is inserted into a right side of the front surface of the chamber 40.

As shown in FIGS. 6 to 8, the expansion chamber 43 of the chamber 40 is partitioned into a first expansion chamber 44 and a second expansion chamber 45 adjacent in the vehicle width direction by a partition wall 54 extending in the vehicle front-rear direction. In the present embodiment, the first expansion chamber 44 is formed on a vehicle left side of the chamber 40, and the second expansion chamber 45 is formed on a vehicle right side of the chamber 40. No member is installed in the first expansion chamber 44, and the introduction pipe 32 enters the second expansion chamber 45 from a right opening 55 of a front wall 51 of the chamber 40. The introduction pipe 32 enters from a front side to the center of the second expansion chamber 45, and no member is installed on a rear side of the second expansion chamber 45.

The introduction pipe 32 includes an upstream pipe 35 disposed upstream of the first catalyst 38, a midstream pipe 36 between the first and second catalysts 38 and 39, and a downstream pipe 37 disposed downstream of the second catalyst 39. The upstream pipe 35 connects the exhaust pipes 31a and 31b and the first catalyst 38, outside the chamber 40. The midstream pipe 36 is inserted into the right opening 55 of the front wall 51 of the chamber 40, and connects the first catalyst 38 outside the chamber 40 and the second catalyst 39 inside the chamber 40. The downstream pipe 37 is curved in a substantially arc shape in a plan view in the second expansion chamber 45 and connects the second catalyst 39 and the partition wall 54. In this way, the second catalyst 39 interposed at an intermediate portion of the introduction pipe 32 is installed in the second expansion chamber 45.

The partition wall 54 is formed with a first opening 56 connecting an outlet of the introduction pipe 32 (downstream pipe 37) to the first expansion chamber 44, and the exhaust gas is introduced from the introduction pipe 32 into the first expansion chamber 44 through the first opening 56. The first opening 56 is formed in an elliptical shape having an inclined major axis, and the downstream pipe 37 is connected to an opening edge of the first opening 56. An upstream end of the downstream pipe 37 is formed in a perfect circular shape fitting with the cylindrical second catalyst 39. A downstream end of the downstream pipe 37 is formed in an elliptical shape fitting with the first opening 56. The height of the downstream pipe 37 decreases from the upstream end toward the downstream end, and thus the height of the chamber 40 is reduced.

The partition wall 54 is further formed with a second opening 57 forward of the first opening 56. The second opening 57 connects the first expansion chamber 44 to the second expansion chamber 45. The exhaust gas flows from the first expansion chamber 44 into the second expansion chamber 45 through the second opening 57. The second opening 57 is formed in a rectangular shape elongated in the front-rear direction, and overlaps with the second catalyst 39 when viewed from the first expansion chamber 44 side. In a plan view, the center line of the second catalyst 39 is parallel to the partition wall 54, and an outer circumferential surface of the second catalyst 39 is exposed to the first expansion chamber 44 from the second opening 57. The exhaust gas in the first expansion chamber 44 is blown to the outer circumferential surface of the second catalyst 39 through the second opening 57, and the second catalyst 39 is activated at an early stage.

The partition wall 54 is further formed with a third opening 58 rearward of the first opening 56. The third opening 58 connects the first expansion chamber 44 to the second expansion chamber 45. The exhaust gas flows from the first expansion chamber 44 into the second expansion chamber 45 through the third opening 58. The third opening 58 is formed in a rectangular shape elongated in the height direction, and overlaps with a part of the inlet 60 of the lead-out pipe 33 when viewed from the first expansion chamber 44 side. The exhaust gas in the first expansion chamber 44 easily flows directly into the inlet 60 of the lead-out pipe 33 through the third opening 58. In this way, the first and second expansion chambers 44 and 45 are connected in two front and rear positions through the first and third openings 56 and 58.

The second opening 57 has a largest area, followed by the first opening 56 and then the third opening 58. Since the area of the second opening 57 is larger than the area of the first opening 56, the exhaust gas smoothly flows from the first opening 56 toward the outer surface of the second catalyst 39 through the second opening 57. Since the area of the third opening 58 is smaller than the area of the second opening 57, the flow of the exhaust gas from the first opening 56 toward the second opening 57 would not be excessively hindered by the third opening 58. The area of the second opening 57 is larger than a vertical projection area of the second catalyst 39 when the second catalyst 39 is viewed from the first expansion chamber 44, and the exhaust gas is effectively blown to the second catalyst 39 from the second opening 57.

The front wall 51 of the chamber 40 is formed with the bulging portion 53 that expands the first expansion chamber 44 forward from the first opening 56 toward the second opening 57. The bulging portion 53 bulges to a position overlapping with the first catalyst 38 in a side view. The expansion of the first expansion chamber 44 facilitates the flow of the exhaust gas from the first opening 56 to the second opening 57. A left side wall 61 of the chamber 40 is formed with an inclined surface 59 that guides the exhaust gas entering the first expansion chamber 44 from the first opening 56 to the second opening 57. Since the exhaust gas flows along the inclined surface 59, the exhaust gas easily flows from the first expansion chamber 44 into the second opening 57.

The lead-out pipe 33 is connected to a right side wall 52 of the chamber 40. The exhaust gas is discharged to the outside from the second expansion chamber 45 by the lead-out pipe 33. The inlet 60 of the lead-out pipe 33 is located rearward (downstream) of the installation location of the second catalyst 39 in the second expansion chamber 45. For this reason, the flow of the exhaust gas from the second opening 57 toward the inlet 60 of the lead-out pipe 33 through the installation location of the second catalyst 39 is formed in the chamber 40. When the exhaust gas passes through the installation location of the second catalyst 39, the second catalyst 39 is effectively warmed up by the heat of the exhaust gas. In the present embodiment, the muffler 34 (see FIG. 3) is connected at a downstream side of the lead-out pipe 33. Alternatively, the lead-out pipe 33 may function as a tail pipe in an engine without the muffler 34.

Figure 9:
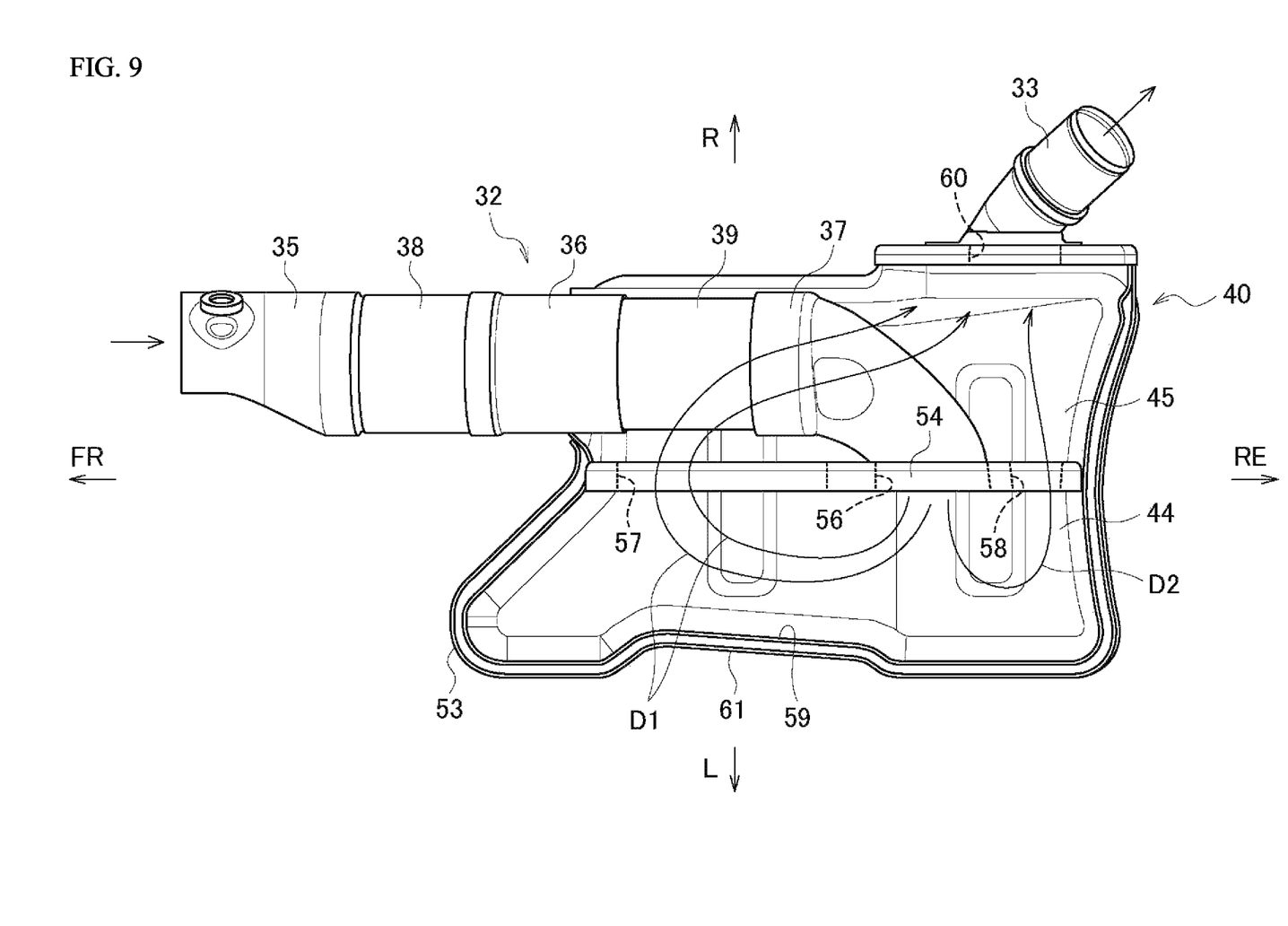
FIG. 9 is a view which shows a flow of the exhaust gas in the chamber according to the present embodiment.

The flow of the exhaust gas in the chamber will be described with reference to FIG. 9. FIG. 9 is a view which shows a flow of the exhaust gas in the chamber according to the present embodiment.

As shown in FIG. 9, the exhaust gas is sent from the exhaust pipes 31a and 31b (see FIG. 3) to the chamber 40 through the introduction pipe 32, and flows from the introduction pipe 32 into the first expansion chamber 44 through the first opening 56. As described above, since the first expansion chamber 44 is expanded forward by the bulging portion 53, the volume of the first expansion chamber 44 forward of the first opening 56 is larger than that rearward of the first opening 56. The area of the second opening 57 is larger than the area of the third opening 58. For this reason, the exhaust gas in the first expansion chamber 44 easily flows forward from the first opening 56, and the flow rate of the exhaust gas flowing from the first opening 56 toward the second opening 57 is large.

The inclined surface 59 of the left side wall 61 of the chamber 40 is inclined such that an interval between the inclined surface 59 and the partition wall 54 decreases toward the front. The exhaust gas in the first expansion chamber 44 is guided to the second opening 57 by the inclined surface 59, and flows into the second expansion chamber 45 from the second opening 57. Since the second opening 57 overlaps with the second catalyst 39 in a side view (see FIG. 8), the high-temperature exhaust gas is blown from the second opening 57 to a side surface of the second catalyst 39 to warm up the second catalyst 39. As indicated by an arrow D1, the flow of the exhaust gas from the first opening 56 toward the lead-out pipe 33 through the second catalyst 39 is formed inside the chamber 40.

A part of the exhaust gas in the first expansion chamber 44 flows rearward from the first opening 56, and flows into the second expansion chamber 45 from the third opening 58. The third opening 58 faces the inlet 60 of the lead-out pipe 33, and the exhaust gas flows from the third opening 58 toward the lead-out pipe 33. As indicated by an arrow D2, the flow of the exhaust gas from the first opening 56 toward the lead-out pipe 33 at a shortest distance is formed inside the chamber 40. When the exhaust gas flows as indicated by the arrows D1 and D2 and flows from the second expansion chamber 45 into the lead-out pipe 33, the exhaust gas in the lead-out pipe 33 is discharged to the outside through the muffler 34 (see FIG. 3).

According to the present embodiment described above, the exhaust gas flows from the exhaust pipes 31a and 31b to the introduction pipe 32 in the chamber 40, and passes through the inside of the second catalyst 39 and flows into the first expansion chamber 44 from the first opening 56. The exhaust gas in the first expansion chamber 44 flows from the first opening 56 toward the second opening 57, and is intensively blown to the outer surface of the second catalyst 39 in the second expansion chamber 45 from the second opening 57. The second catalyst 39 is warmed up in a short time by the heat of the high-temperature exhaust gas, and the purification performance of the exhaust gas can be improved by the early activation of the second catalyst 39.

In the present embodiment, the expansion chamber of the chamber is partitioned into the first and second expansion chambers adjacent in the vehicle width direction (left-right direction) by the partition wall. However, the method for partitioning the expansion chamber by the partition wall is not particularly limited. For example, the expansion chamber of the chamber may be partitioned by a partition wall into first and second expansion chambers adjacent in the front-rear direction.

In the present embodiment, the first expansion chamber is formed on a left side of the chamber and the second expansion chamber is formed on a right side of the chamber. Alternatively, the second expansion chamber may be formed on the left side of the chamber and the first expansion chamber may be formed on the right side of the chamber. In this case, the introduction pipe enters the left side of the chamber, and the catalyst is installed in the second expansion chamber on the left side of the chamber.

In the present embodiment, the first catalyst is interposed in the introduction pipe outside the chamber and the second catalyst is interposed in the introduction pipe inside the chamber. Alternatively, at least one catalyst may be interposed in the introduction pipe inside the chamber. For example, catalyst may be interposed only in the introduction pipe in the chamber, or a plurality of catalysts may be interposed in the introduction pipe in the chamber.

In the present embodiment, the introduction pipe enters the second expansion chamber from the front wall of the chamber. However, the introduction pipe may be formed as long as the introduction pipe enters the second expansion chamber. For example, the introduction pipe may enter the second expansion chamber from the right side wall, an upper wall, or a bottom wall of the chamber.

In the present embodiment, the bulging portion is formed in the chamber. Alternatively, the bulging portion may not be formed in the chamber as long as a sufficient volume of the first expansion chamber can be ensured.

In addition, the exhaust device according to the present embodiment can be appropriately applied to other straddle-type vehicles such as a buggy-type automatic three-wheel vehicle. Here, the straddle-type vehicle is not limited to a general vehicle on which a rider rides at a posture of straddling a seat, and further includes a scooter-type vehicle on which a rider rides without straddling a seat.

As described above, an exhaust device (30) according to the present embodiment purifies exhaust gas discharged from an engine (10) through an exhaust pipe (31a, 31b). The exhaust device includes: a chamber (40) that forms an exhaust chamber (43) of the exhaust gas at a downstream side of the exhaust pipe; a partition wall (54) that partitions the expansion chamber into a first expansion chamber (44) and a second expansion chamber (45); an introduction pipe (32) that enters the second expansion chamber from a downstream end of the exhaust pipe; and a catalyst (second catalyst 39) interposed at an intermediate portion of the introduction pipe in the second expansion chamber. The partition wall is formed with a first opening (56) connecting an outlet of the introduction pipe to the first expansion chamber and a second opening (57) connecting the first expansion chamber to the second expansion chamber. The second opening overlaps with the catalyst when viewed from a side of the first expansion chamber. According to this configuration, the exhaust gas flows from the exhaust pipe to the introduction pipe in the chamber, passes through the catalyst, and flows into the first expansion chamber from the first opening. The exhaust gas in the first expansion chamber flows from the first opening toward the second opening, and is intensively blown to an outer surface of the catalyst in the second expansion chamber from the second opening. The catalyst is warmed up in a short time by the heat of the high-temperature exhaust gas, and the purification performance of the exhaust gas can be improved by early activation of the catalyst.

In the exhaust device according to the present embodiment, the partition wall partitions the expansion chamber into the first expansion chamber and the second expansion chamber adjacent in the vehicle width direction. The second opening is located forward of the first opening, and an area of the second opening is larger than an area of the first opening According to this configuration, the partition wall extends in a front-rear direction to partition the first expansion chamber and the second expansion chamber, and thus the second opening can be formed longer in the front-rear direction in the partition wall and the overlap between the second opening and the catalyst can be made large. Since the area of the second opening is larger than the area of the first opening, the exhaust gas can smoothly flow from the first opening toward the outer surface of the catalyst through the second opening.

In the exhaust device according to the present embodiment, the partition wall is further formed with a third opening (58) on a side opposite to the second opening with the first opening therebetween. The third opening connects the first expansion chamber and the second expansion chamber. An area of the third opening is smaller than the area of the second opening. According to this configuration, even when the third opening is formed in the partition wall, the flow of the exhaust gas from the first opening toward the second opening would not be excessively hindered.

The exhaust device according to the present embodiment further includes a lead-out pipe (33) that is configured to discharge the exhaust gas from the second expansion chamber to the outside, and an inlet (60) of the lead-out pipe is located at a downstream side of an installation position of the catalyst in the second expansion chamber. According to this configuration, the flow of the exhaust gas from the second opening toward the inlet of the lead-out pipe through the installation location of the catalyst is formed in the chamber, and the catalyst is effectively warmed up by the heat of the exhaust gas when the exhaust gas passes through the installation location of the catalyst.

In the exhaust device according to the present embodiment, an outer wall of the chamber is formed with a bulging portion (53) that is configured to expand the first expansion chamber in a direction from the first opening toward the second opening According to this configuration, the exhaust gas can easily flow from the first opening toward the second opening by the expansion of the first expansion chamber.

In the exhaust device according to the present embodiment, an outer wall of the chamber is formed with an inclined surface (59) that is configured to guide the exhaust gas entering the first expansion chamber from the first opening to the second opening According to this configuration, since the exhaust gas flows along the inclined surface, the exhaust gas can easily flow from the first expansion chamber into the second opening.

Although the present embodiment has been described, all or a part of the above-described embodiment and modifications may be combined as other embodiment.

The technique of the present invention is not limited to the above-described embodiment, and various changes, substitutions, and modifications may be made without departing from the spirit of the technical idea of the present invention. The present invention may be implemented using other methods as long as the technical concept can be implemented by the methods through advance of the technology or other derivative technology. Therefore, the claims cover all embodiments that may be included within the scope of the technical concept.

What is claimed is:

1. An exhaust device that purifies exhaust gas discharged from an engine through an exhaust pipe, the exhaust device comprising:
   a chamber that forms an expansion chamber of the exhaust gas at a downstream side of the exhaust pipe;
   a partition wall that partitions the expansion chamber into a first expansion chamber and a second expansion chamber;
   an introduction pipe that enters the second expansion chamber from a downstream end of the exhaust pipe; and
   a catalyst interposed at an intermediate portion of the introduction pipe in the second expansion chamber,
   wherein the partition wall is formed with a first opening connecting an outlet of the introduction pipe to the first expansion chamber and a second opening connecting the first expansion chamber to the second expansion chamber, and the second opening overlaps with the catalyst when viewed from a side of the first expansion chamber,
   wherein the partition wall extends in a vehicle front-rear direction, and
   wherein, in a plan view, a center line of the catalyst is parallel to the partition wall.

2. The exhaust device according to claim 1,
   wherein the partition wall partitions the expansion chamber into the first expansion chamber and the second expansion chamber adjacent in a vehicle width direction, and
   wherein the second opening is located forward of the first opening, and an area of the second opening is larger than an area of the first opening.

3. The exhaust device according to claim 1,
   wherein the partition wall is further formed with a third opening on a side opposite to the second opening with the first opening therebetween, the third opening connecting the first expansion chamber and the second expansion chamber, and
   wherein an area of the third opening is smaller than an area of the second opening.

4. The exhaust device according to claim 1, further comprising: a lead-out pipe that is configured to discharge the exhaust gas from the second expansion chamber to outside,
   wherein an inlet of the lead-out pipe is located at a downstream side of an installation location of the catalyst in the second expansion chamber.

5. The exhaust device according to claim 1, wherein an outer wall of the chamber is formed with a bulging portion that is configured to expand the first expansion chamber in a direction from the first opening toward the second opening.

6. The exhaust device according to claim 1, wherein an outer wall of the chamber is formed with an inclined surface that is configured to guide the exhaust gas entering the first expansion chamber from the first opening to the second opening.

* * * * *